(12) United States Patent
Feltenberger et al.

(10) Patent No.: US 6,206,630 B1
(45) Date of Patent: Mar. 27, 2001

(54) HIGH TORQUE IMPULSE TURBINE

(75) Inventors: Bruce D. Feltenberger, Hudson, OH (US); Ronald S. Feltenberger, Fairview, PA (US)

(73) Assignee: Universal Electric Power Corp.

(*) Notice: Subject to any disclaimer, the term of this patent is extended or adjusted under 35 U.S.C. 154(b) by 0 days.

(21) Appl. No.: 09/065,404

(22) Filed: Apr. 24, 1998

(51) Int. Cl.[7] .................................................. F03B 15/06
(52) U.S. Cl. .......................... 415/3.1; 415/4.1; 415/906; 415/1; 60/398; 290/54
(58) Field of Search .............................. 415/2.1, 3.1, 4.1, 415/906, 1; 416/196 A, 178, 187, 201 R; 290/54; 60/398

(56) References Cited

U.S. PATENT DOCUMENTS

| | | | |
|---|---|---|---|
| 973,241 | * 10/1910 | Vestal et al. | 415/906 |
| 4,076,447 | * 2/1978 | Granath et al. | 415/3.1 |
| 4,104,536 | * 8/1978 | Gutsfeld | 290/54 |
| 4,187,686 | * 2/1980 | Pommier | 60/647 |
| 4,629,904 | * 12/1986 | Rojo, Jr. et al. | 290/52 |
| 5,430,332 | * 7/1995 | Dunn, Jr. | 415/3.1 |
| 5,755,553 | * 5/1998 | Laemthongsawad | 415/3.1 |

* cited by examiner

Primary Examiner—Edward K. Look
Assistant Examiner—Richard Woo
(74) Attorney, Agent, or Firm—Emerson & Skeriotis; Roger D. Emerson; Timothy D. Bennett (57) ABSTRACT

A water driven impulse turbine has a barrel rotatably mounted upon an axle, with a plurality of runner blades extending tangentially from the barrel. Side plates secure the runner blades on opposite sides thereof. A breastplate is maintained in concentric juxtaposition with the wheel so defined. A penstock is interposed between a water source and the breastplate to pass water into the runner blades. The turbine may consist of a plurality of axially interconnected wheel sections of similar or dissimilar nature to optimize performance.

25 Claims, 12 Drawing Sheets

HIGH TORQUE IMPULSE TURBINE

TECHNICAL FIELD

The invention herein, referred to as a tangential water wheel and also referred to as an impulse turbine, is an improvement over prior art water wheels by virtue of its design, materials, type of construction, its ability to accomodate higher head ranges and higher flow rates, and the manner in which it is used. Said device is also an improvement over impulse turbines of today by virtue of its simplified design, type of materials used in construction, lower cost to manufacture and install, its ability to operate efficiently under low to medium head ranges and its ability to operate with higher flow rates.

BACKGROUND ART AND GENERAL DESCRIPTION OF THE INVENTION

This invention relates generally to the field of electrical power generation by utilizing, as the prime mover, an impulse turbine, which is part of the family of tangential water wheels. The turbine is capable of being constructed in various sizes ranging from several inches in diameter to 30 feet or more, and from a few inches in width to several feet. A typical high torque turbine would be 20 feet in diameter and 5 or 6 feet in width. A horizontal axle is fixed to the turbine and rotates with it. Ideally, incoming water approaches a runner portion of the turbine in an undershot or a breastshot manner similar to the prior art Poncelet wheel, but the turbine may be adapted to an overshot condition or to a combination of approach angles.

The incoming water pushes against blades or buckets which are an integral part of the runner portion of the turbine and thereby produces rotation. The runner is designed to retain water for a portion of each revolution, unlike the Pelton turbine which deflects the water. To enhance retention of water, the turbine is fitted with a breastplate undercarriage which is connected to the incoming water source. The breastplate is not connected to the turbine and does not rotate.

The high torque turbine rotates relatively slowly, achieving a top speed in most cases of 45 to 60 r.p.m., and utilizes a speed increaser before connecting to a generator.

The incoming water ideally is provided by pipes or penstocks and, depending on the width of the runner, the water can be diffused through a manifold arrangement providing more than one inlet through the breastplate.

Incoming water approaches the runner tangentially and imparts all or nearly all of its energy to the runner in a tangential direction. The water travels tangentially after engaging the runner and does not substantially change direction. The water exists the runner/breastplate area at an angle combining tangential and outward flow away from the axle. The runner is designed to receive incoming water with near zero impact and discharge water with near zero forward velocity.

All of the energy transferred to the turbine from the water occurs in the outer portion of the turbine and thereby produces a high torque on the axle. The high torque turbine differs from the prior art Poncelet water wheel in the following ways:

1) The Poncelet water wheel was popularly used in the mid 1800's. Since then, technology advances have provided for improved materials and manufacturing processes such as close tolerance machining; the use of precision bearings producing a balanced rotation with decreased friction losses; and durability with minimum maintenance.

2) Incoming water is provided to the high torque turbine via one or more penstocks/pipes.

3) The high torque turbine offers an improved runner design which reduces or eliminates axial thrust.

4) The high torque turbine rotates faster than the Poncelet wheel and accommodates a higher head and flow rate.

5) The high torque turbine is the prime mover for producing electricity.

6) The high torque turbine is intended to be mounted on the face of a dam or adjacent to a dam near the tailwater area or near a river.

7) In its preferred form, the high torque turbine is wider than the Poncelet wheel and larger in diameter.

The high torque turbine differs from the prior art Pelton turbine in the following ways.

1) The high torque turbine retains water rather than deflecting it.

2) The high torque turbine runner design is simpler and more economical to manufacture.

3) The high torque turbine can accomodate higher flow rates and lower head ranges.

4) The high torque turbine is designed to rotate slowly.

5) The high torque turbine utilizes a breastplate to help it retain water.

6) The high torque turbine utilizes a simplified water distribution system and does not require nozzles.

7) The high torque turbine is intended for external use and can be installed with or without a housing.

8) The high torque turbine utilizes a speed increaser whereas the Pelton generally does not.

OBJECTS OF INVENTION

It is an object of the invention to provide a system for generating electricity which derives its source of power from water flowing from a higher elevation to a lower elevation.

Another object of the invention is to provide a system for generating electricity which is economical to manufacture and install at existing dams; as a part of new dam construction projects or on a bank adjacent to a river or stream.

A further object of the invention is to provide a water power generating system which combines principles of old fashioned water wheels and modern day impulse turbines.

With the above and other objects in view, the present invention consists of the combination and arrangement of parts hereinafter more fully described, illustrated in the accompanying drawings and more particularly pointed out in the appended claims, it being understood that changes may be made in the form, size, proportions and details of construction without departing from the spirit or sacrificing any of the advantages of the invention.

Specifically, the foregoing and other objects of the invention are attained by a water driven impulse turbine, comprising: an axle; a wheel mounted upon said axle, said wheel having a pair of side plates and a plurality of runner blades interposed therebetween; a breastplate fixed adjacent to and substantially concentric with said wheel; a source of water in communication with said breastplate and said runner blades, said water passing through said breastplate and against said runner blades and thereby effecting rotation of said wheel upon said axle.

DETAILED DESCRIPTION OF THE PREFERRED EMBODIMENT

Figure 1:
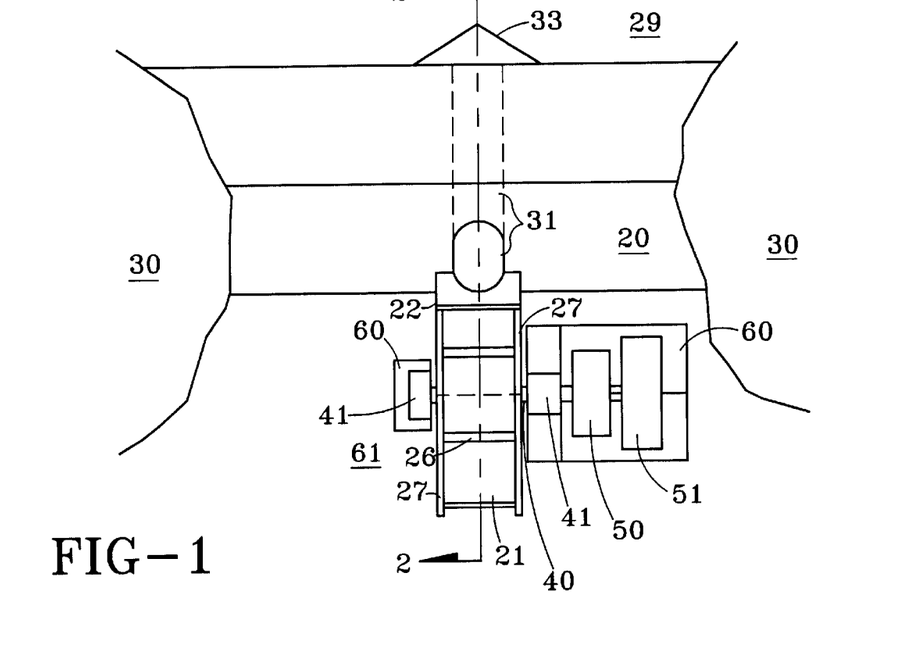
FIG. 1 is a top plan view of one embodiment of the generating system according to the invention.
Figure 2:
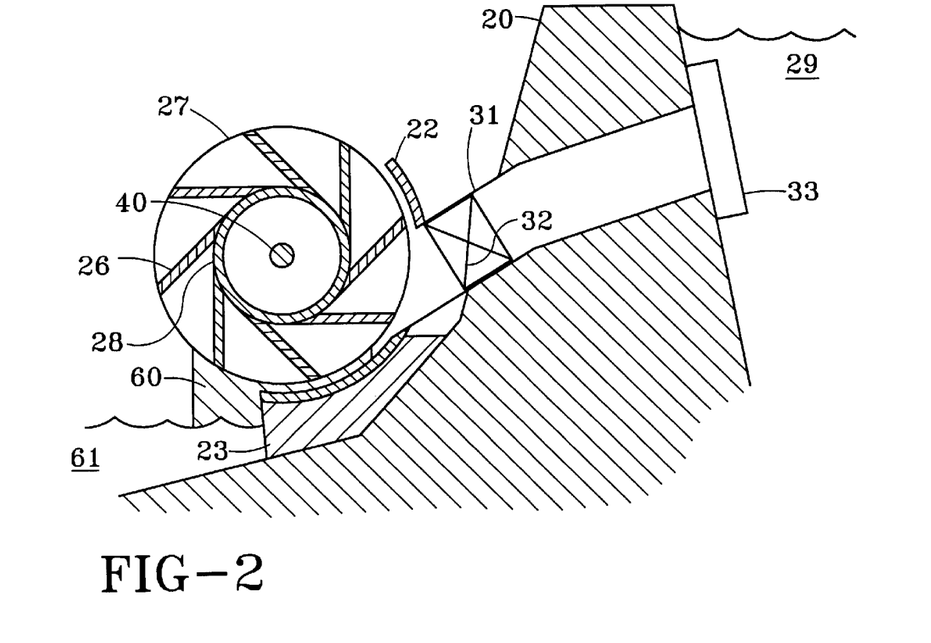
FIG. 2 is a cross-sectional view taken on line 2—2 of FIG. 1.
Figure 3:
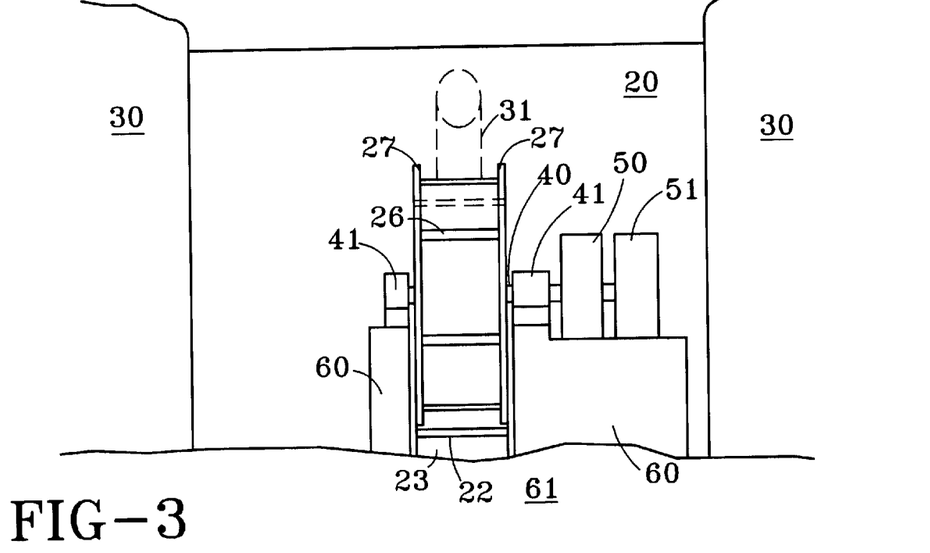
FIG. 3 is a front plan view of the embodiment of FIG. 1.

Now, with more particular reference to the drawings, in the embodiment of FIGS. 1, 2 and 3, a high torque turbine 21 is disclosed situated near the face of a dam 20. The dam confines a body of water 29 referred to as a reservoir. The reservoir is also confined by earthen retainer walls 30 which could be parts of natural hills, mountains or sides of valleys. The high torque turbine 21 is fitted with a breastplate 22 which is mounted to the dam or dam substructure by means of supports 23. Said supports can be constructed from reinforced concrete or other suitable materials and can be anchored to the dam or near the dam as required. The breastplate 22 is curved to a radius exceeding the radius of the turbine, ideally by ¼ inch to 1 inch and is fixed in a stationary permanent position. The breastplate does not rotate. The breastplate is fitted to a pipe or penstock 31 which extends through the dam and provides a means of conveying water from the reservoir to the turbine. The penstock can be fitted with one or more valves and gauges 32 to control and monitor the flow of water. The valves would be ideally equipped to operate automatically and by remote control. On the reservoir side of the dam, the penstock is fitted with a trash catcher 33. The trash catcher could be one of a variety of commonly available models and serves as a means of filtering debris, fish and other animals from entering the water flow to the turbine.

The axle 40 is an integral part of the turbine and rotates with the turbine. The axle 40 is fitted with bearings near its ends which are housed and supported in bearing mounting blocks 41. The axle is coupled to a speed increasing device 50 which is preferably of a gear box variety. The speed increaser is then coupled to a generator 51 which produces electricity. The bearing mounting blocks 41, the speed increaser 50 and the generator 51 are mounted to structural supports 60 which can be made of reinforced concrete or other suitable materials and can be fastened to the dam or dam substructure as desired.

In operation, water flows from the reservoir 29, through the penstock 31, through the breastplate 22, and pushes against runner blades 26 thus producing rotation. The runner blades are fastened by any conventional means such as welding to the turbine side plates 27 and the runner barrel 28. The runner barrel 28 also is fastened to the side plates 27. The breastplate 22 serves as a means of containing all or nearly all of the incoming water in the runner part of the turbine until each blade 26 rotates past the end of the breastplate. At that time water drops or is discharged from the turbine into the tailwater area 61 adjacent to the dam. The lower end of the breastplate is approximately in line with the vertical centerline of the turbine and the higher end of the breastplate extends somewhat above the horizontal centerline of the turbine.

In the embodiment shown hereinafter, elements of like nature to those presented with respect to the embodiment of FIGS. 1–3 bear the same numeric designation, and may not be discussed in detail due to their similarity to elements already presented.

Figure 4:
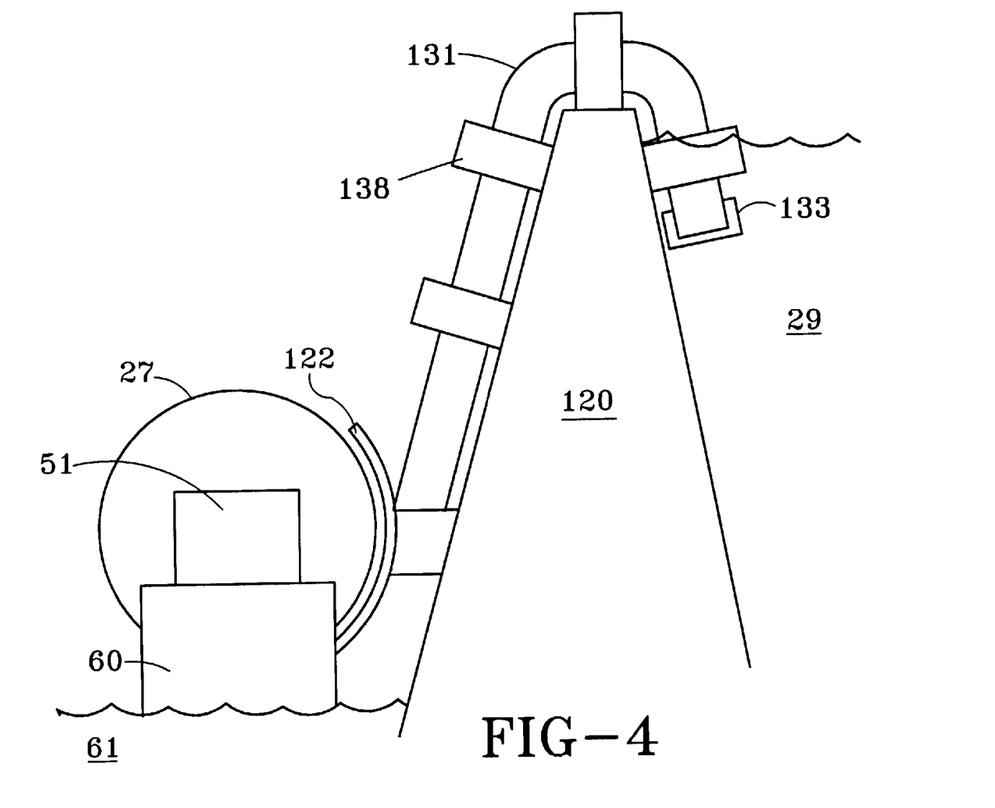
FIG. 4 is a side view of an embodiment similar to FIG. 1.

The embodiment of the invention shown in FIG. 4 is a side view of an embodiment utilizing a syphon penstock 131. The syphon penstock 131 conveys water over the dam 120 to the breastplate 122. The syphon penstock is fixed to the dam by support brackets 138 and is also fitted with a trash catcher 133.

Figure 5:
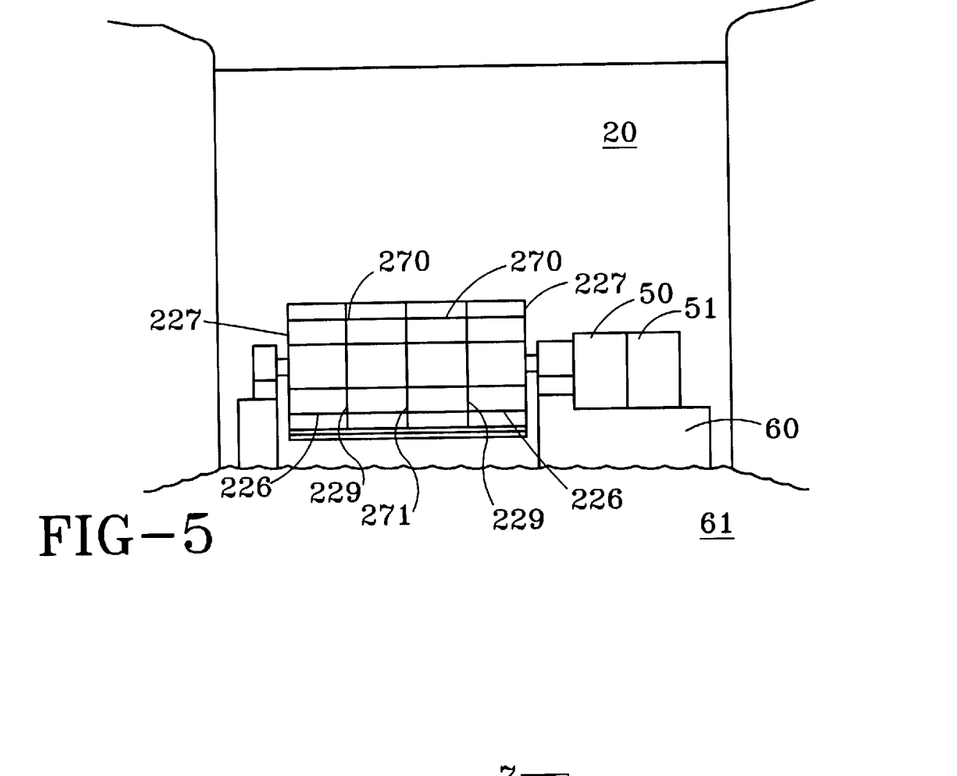
FIG. 5 is a front plan view similar to FIG. 1 of another embodiment of the invention.

The embodiment of the invention shown in FIG. 5 depicts a turbine which is substantially wider and shows four sections stacked together on the same axle. Side plates 227 are fastened to runner blades 226 which are fastened to support plates 229. Additional runner blades 270 are fastened to another support plate 271 and to support plates 229 and in this manner all sections of the turbine rotate together. Other numbers of sections may be used on the same axle thus providing an option to utilize varying widths. A wider turbine provides for a greater flow of water to act upon it. Thus a turbine ten feet wide could process twice as much water as a turbine five feet wide and a turbine fifteen feet wide would accommodate three times the flow as a turbine five feet wide.

Figure 6:
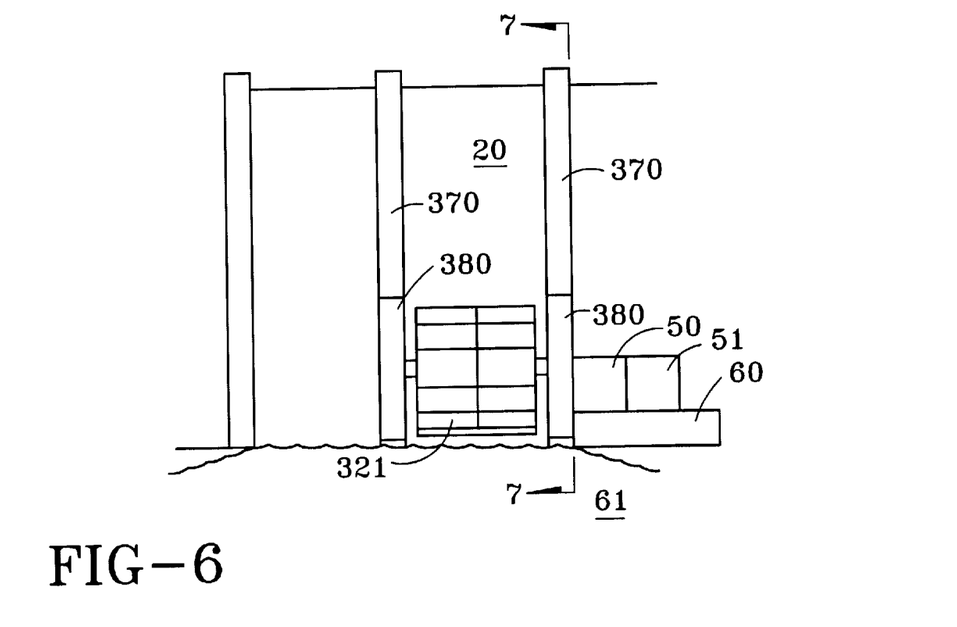
FIG. 6 is a front plan view similar to FIG. 3 of another embodiment of the invention.
Figure 7:
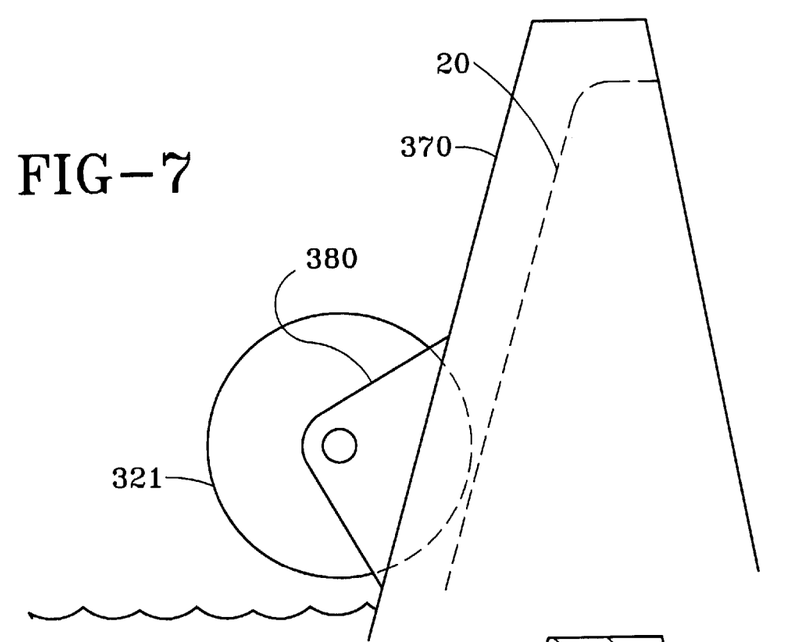
FIG. 7 is a side view taken on line 7—7 of FIG. 6.
Figure 8:
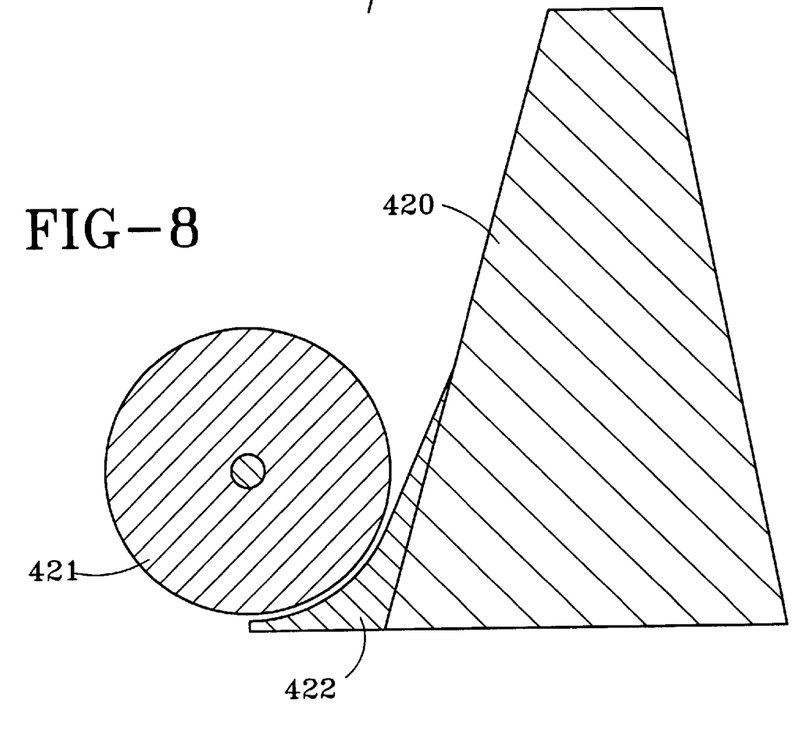
FIG. 8 is a cross sectional view similar to FIG. 2 of yet another embodiment of the invention.
Figure 9:
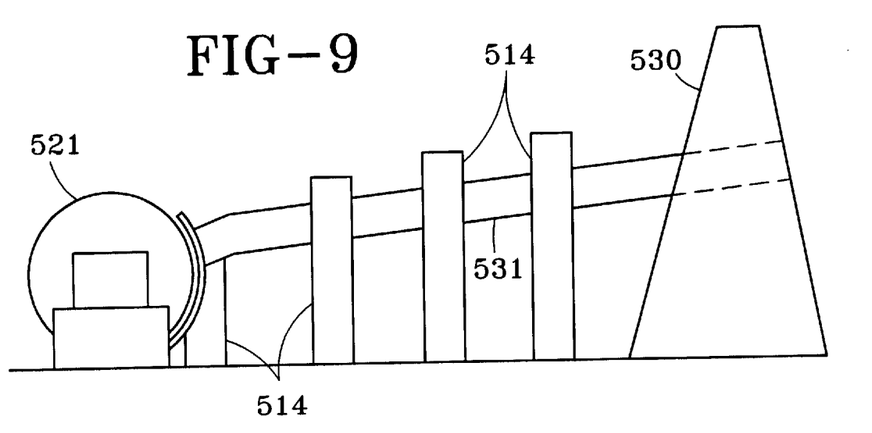
FIG. 9 is a side view similar to FIG. 4 of yet another embodiment of the invention.
Figure 10:
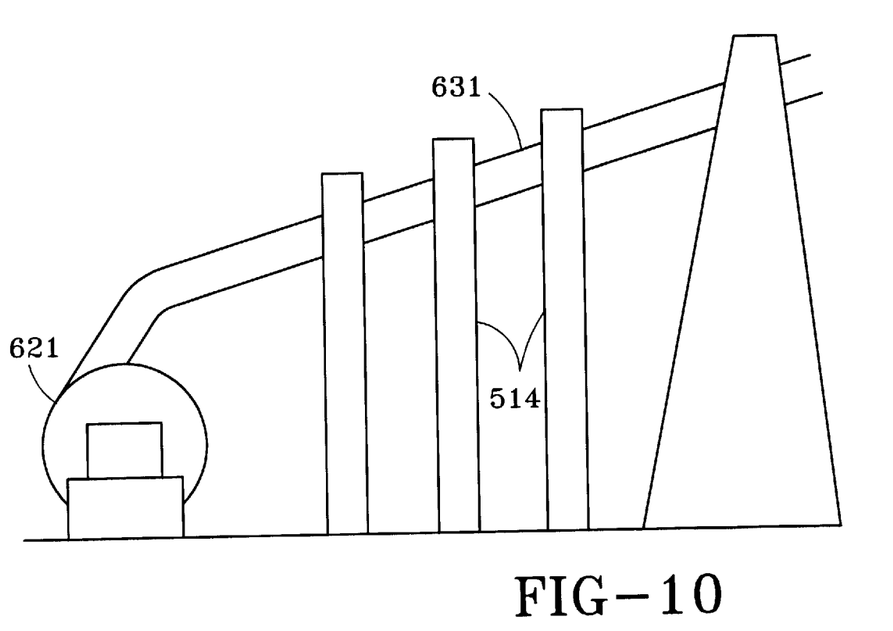
FIG. 10 is a side view similar to FIG. 4 of yet another embodiment of the invention.
Figure 11:
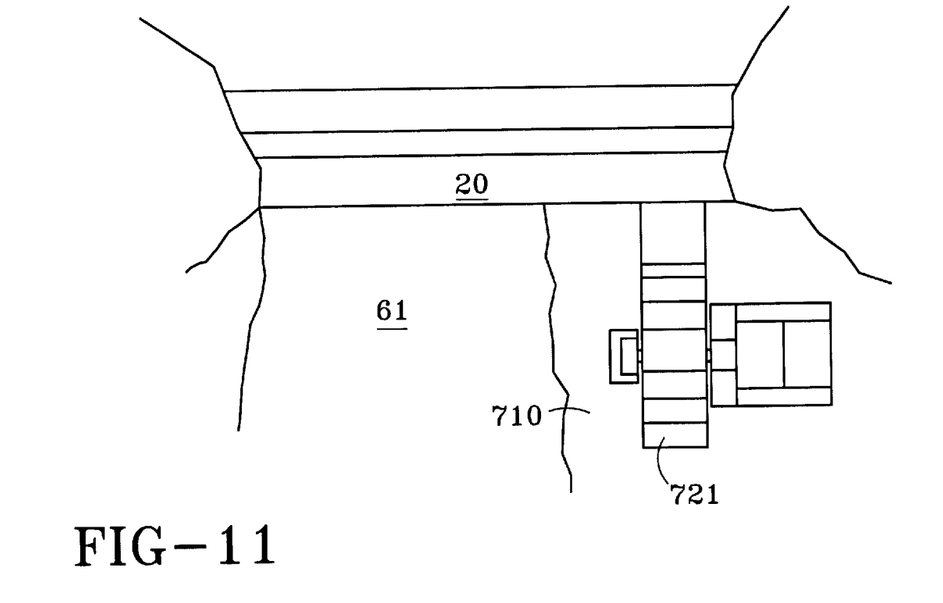
FIG. 11 is a top plan view similar to FIG. 1 of yet another embodiment of the invention.
Figure 12:
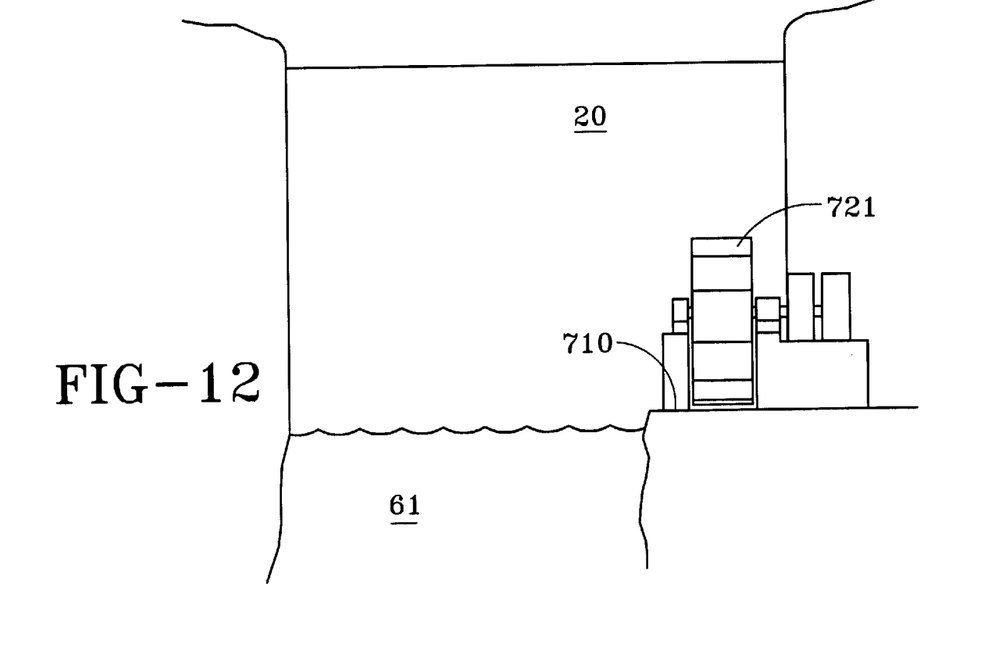
FIG. 12 is a front plan view of the embodiment described in FIG. 11.
Figure 13:
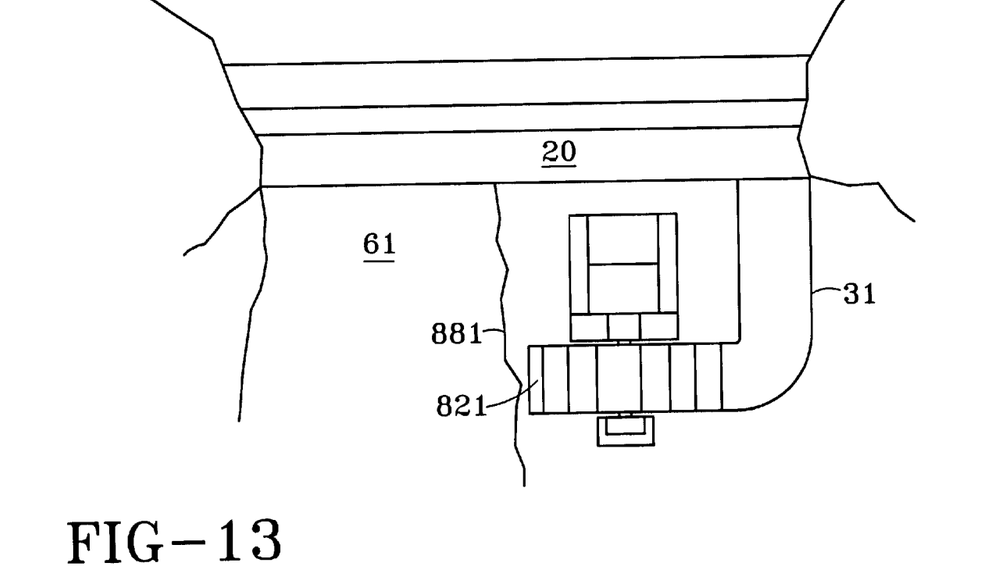
FIG. 13 is a top plan view similar to FIG. 11 of yet another embodiment of the invention.

The embodiment of the invention shown in FIG. 6 and FIG. 7 depicts a turbine 321 which is mounted to the spillway side structure 370 by means of supports 380 which are fastened to the side structures. In the embodiment of the invention shown in FIG. 8 the breastplate 422 is attached directly to the spillway area of the dam 420 and provides for water cascading down the spillway to enter the turbine 421 without the use of a penstock. In the embodiment of the invention shown in FIG. 9 the turbine 521 is situated father away from the dam 520 and receives water via a longer penstock 531. This penstock can be supported by a plurality of supports 514 of any suitable conventional nature. In the embodiment of the invention shown in FIG. 10, the penstock 631 approaches the turbine 621 in an overshot manner and in this arrangement a breastplate may not be required. FIG. 11 and FIG. 12 depict an embodiment of the invention where the turbine 721 is situated on dry land or a concrete apron 710 adjacent to the tailwater area 61. In the embodiment of the invention shown in FIG. 13, the turbine 821 is situated such that the direction of the discharge is approximately perpendicular to the shoreline 881.

Figure 14:
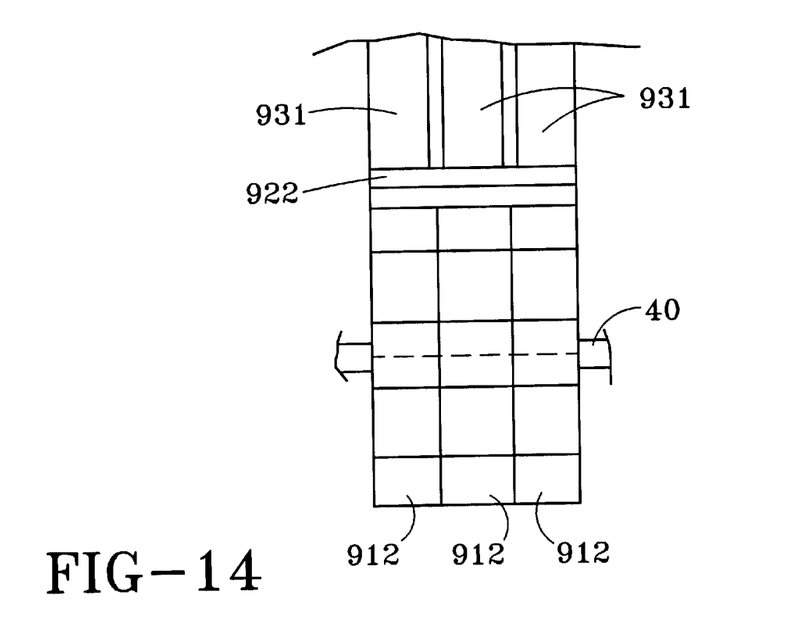
FIG. 14 is a top plan view similar to FIG. 5 of yet another embodiment of the invention.

In the embodiment of the invention shown in FIG. 14, three runner sections 912 are stacked together on a common axle 40. Three penstocks 931 are shown attached to a common breastplate 922.

Figure 15:
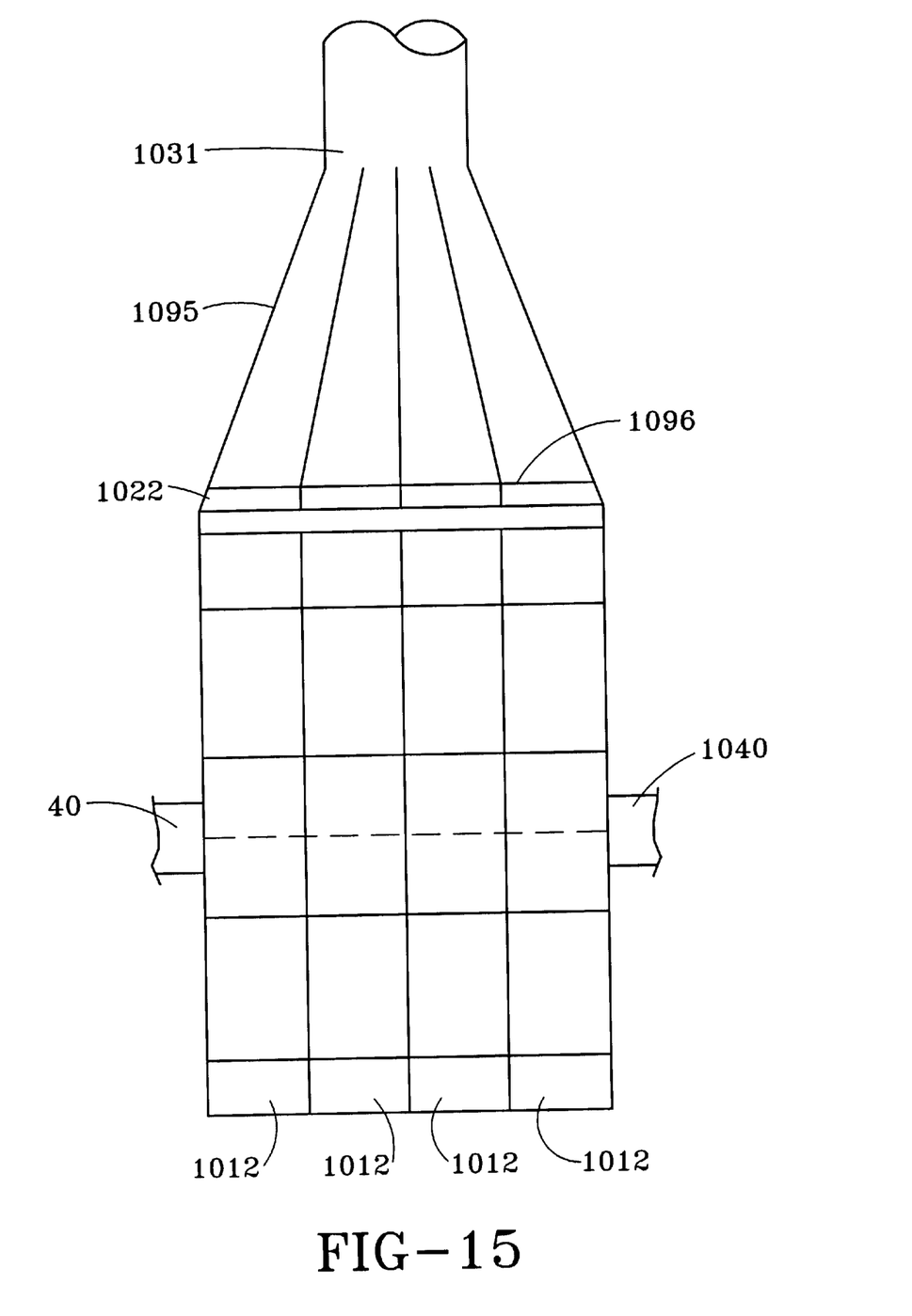
FIG. 15 is a top plan view similar to FIG. 14 of yet another embodiment of the invention.

In the embodiment of the invention shown in FIG. 15, four runner sections 1012 are stacked together on a common axle 1040. One penstock 1031 supplies water to a manifold 1095 which disperses water through four separate inlets 1096 and through the breastplate 1022.

Figure 16:
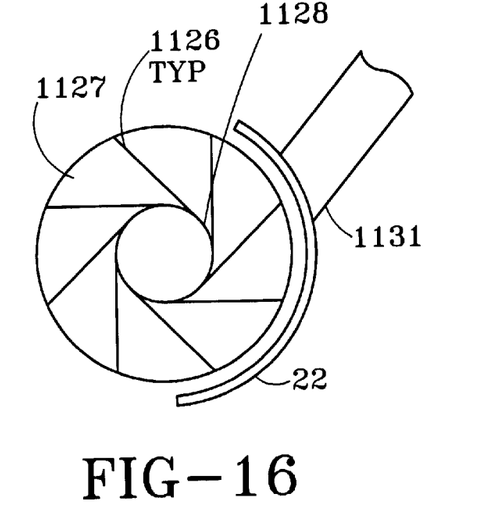
FIG. 16 is a cross sectional view similar to FIG. 2 of yet another embodiment of the invention.

The embodiment of the invention shown in FIG. 16 utilizes eight runner blades 1126 which are equally spaced around the runner barrel 1128. Each runner blade contacts the runner barrel in a tangential manner and is fastened to the runner barrel preferably by welding. The runner blades are also secured to the side plate 1127 in a similar manner. Ideally, with low head application the approach angle of the inlet or penstock 1131 as taken from the horizontal centerline of the turbine would equal 360° divided by the number of runner blades used in the turbine. Thus if eight runner blades are used, the approach angle would be 45°. This specification represents the preferred relationship between the runner blades and penstock in order to achieve the highest possible rotational speed. The exact number of runner blades used in the design of a given high torque turbine can vary and will generally increase as the head increases. The diameter of the penstock 1131 can vary depending on its length and can have more than one diameter on the same penstock. For instance, the diameter of the penstock near the dam may be larger than the diameter where it enters the breastplate. Ideally, the penstock diameter as it approaches the breastplate would be equal to the depth of the runner which is defined as the difference between the radius of the side plate 1127 and the runner barrel 1128. However, this relationship can vary depending on conditions and design criteria.

Figure 17:
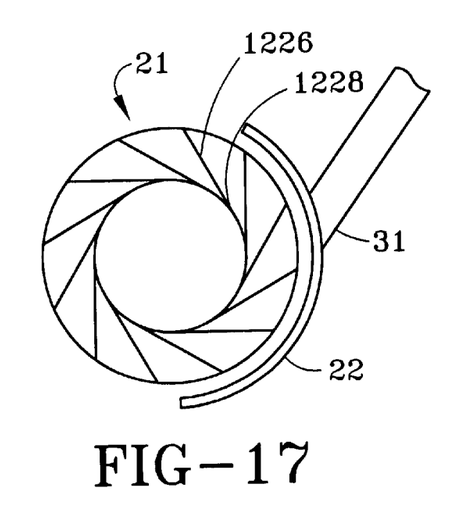
FIG. 17 is a cross sectional view similar to FIG. 16 of yet another embodiment of the invention.

In the embodiment of the invention shown in FIG. 17, a large number of runner blades 1226 are utilized with a runner barrel 1228 diameter which produces a more shallow runner system.

Figure 18:
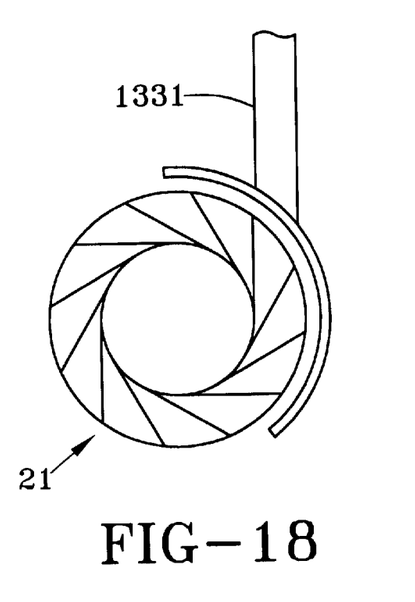
FIG. 18 is a cross sectional view similar to FIG. 16 of yet another embodiment of the invention.
Figure 19:
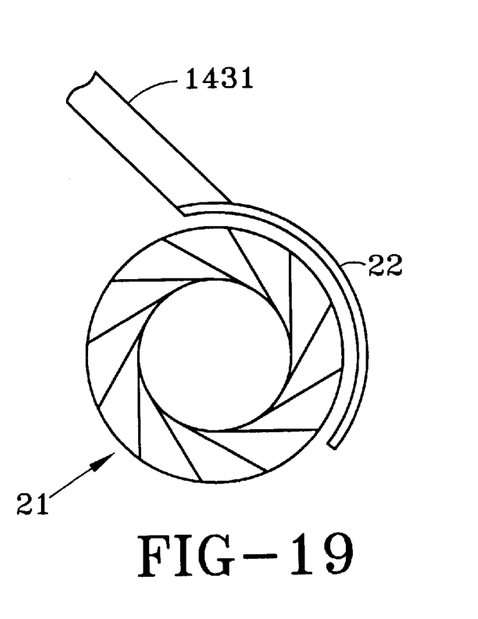
FIG. 19 is a cross sectional view similar to FIG. 16 of yet another embodiment of the invention.

In the embodiment of the invention shown in FIG. 18, a vertical penstock 1331 is utilized which constitutes an overshot approach and in FIG. 19 an extensive overshot approach is shown where the penstock 1431 approaches the turbine on the vertical centerline of the turbine. Approach angles of this type are best suited for medium to high head applications. In situations of this type, a higher rotational speed is developed due to a faster incoming velocity of the water. For these applications the breastplate can be eliminated, however, it may be useful to keep the breastplate to prevent early discharge of water due to centrifugal force. In cases where the rotational speed of the turbine is high enough, it may be possible to have a direct drive from the axle of the turbine to the generator, thus eliminating the speed increaser.

Figure 20:
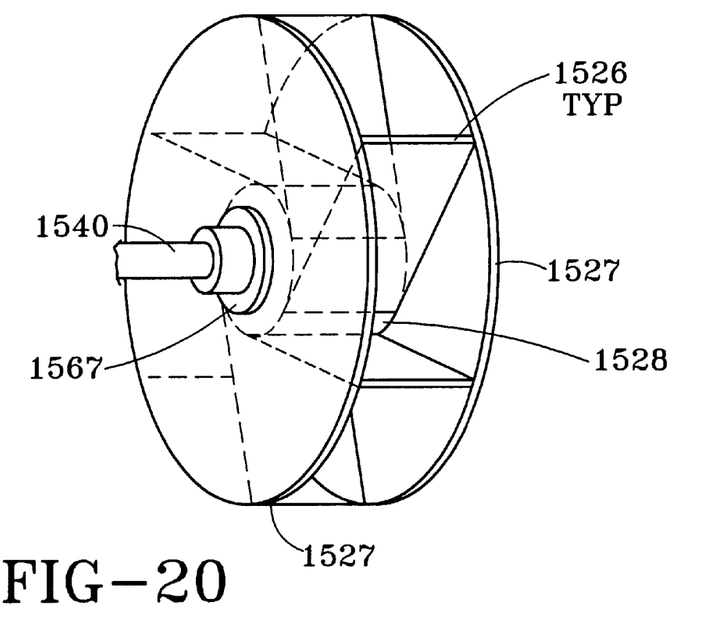
FIG. 20 is an enlarged perspective view of a turbine according to the invention.

In the embodiment of the invention shown in FIG. 20, six runner blades 1526 are depicted. These runner blades can be flat plates preferably made of stainless steel, aluminum or other suitable material. The runner blades may be fastened by any conventional means such as welding to the side plates 1527 and to the runner barrel 1528. The runner barrel 1528 is fastened to side plates 1527 by conventional means such as welding or bolts. In its preferred form, each side plate would be fitted with a hub 1567 which can be an integral part of the side plate or can be a separate piece which is fastened to the side plate by conventional means such as bolts. The center of the hub has a close tolerance bore to accommodate a close fit with the axle 1540 and would also include a keyway provision for direct drive of the axle. The side plate members also have a bore of a clearance size for the axle. The runner barrel 1528 consists of a cylinder with a large inside diameter. The outside diameter of the runner barrel comprises the bottom of the runner system. The entire turbine in its preferred form may be made of steel, aluminum or other suitable material such as high performance plastic.

Figure 21:
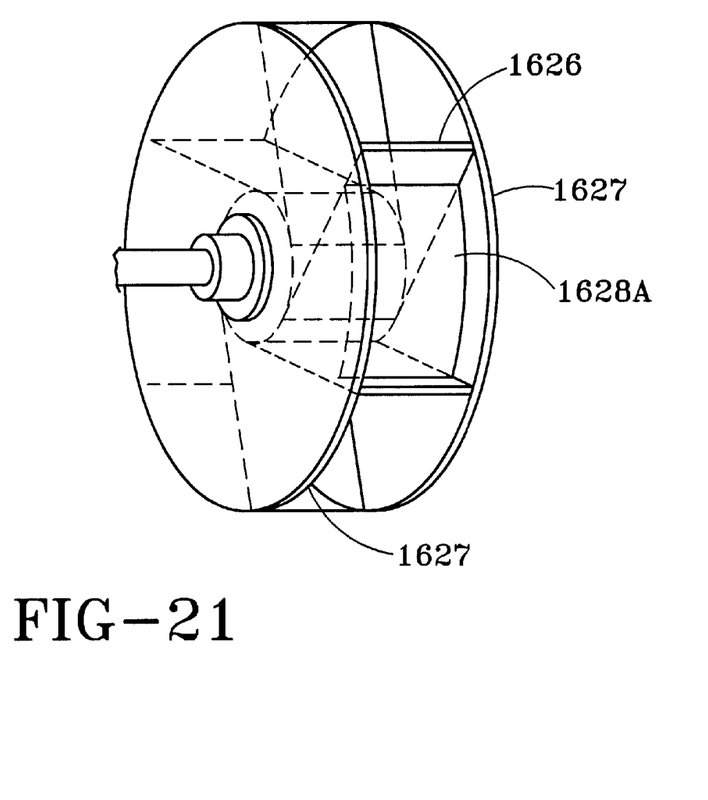
FIG. 21 is an enlarged perspective view similar to FIG. 20 of another embodiment of the invention.

In the embodiment of the invention shown in FIG. 21, a runner barrel section 1628A is disclosed. This barrel section is capable of being placed and removed as desired and, when in use, is intended to be secured to runner blades 1626 and side plates 1627. A plurality of barrel sections are used; one between every two runner blades, equal in number to the number of runner blades. In this manner, the barrel sections become the bottom of the runner which changes the volume of water the runner can accept. This also keeps the impact of the incoming water and the weight of the water closer to the periphery of the turbine which produces a high torque with the same volume of water. The runner barrel sections can be flat, concave, convex or some other shape as desired. Runner barrel sections may be used during periods of reduced water flow and removed during periods of higher flow.

Figure 22:
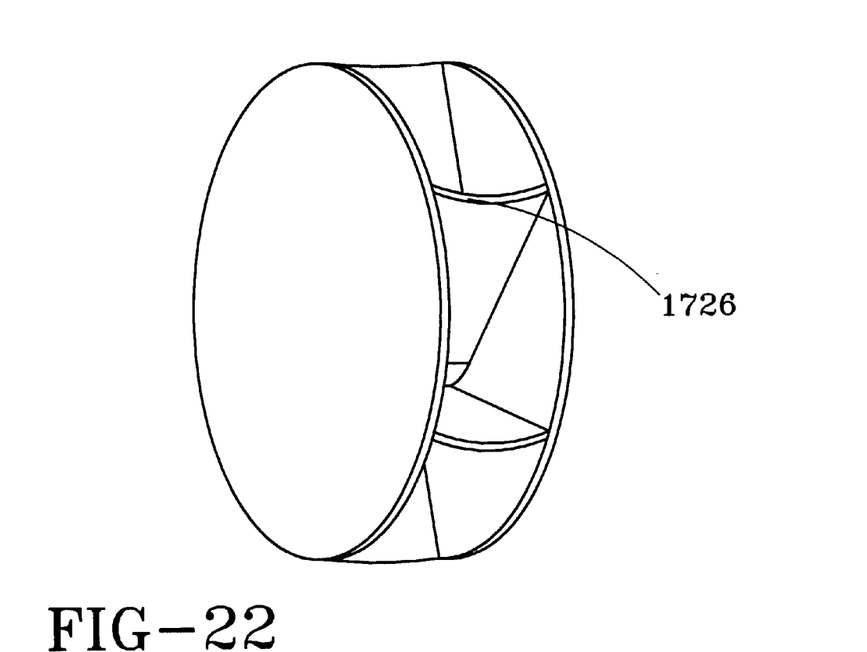
FIG. 22 is an enlarged perspective view similar to FIG. 20 of yet another embodiment of the invention.
Figure 23:
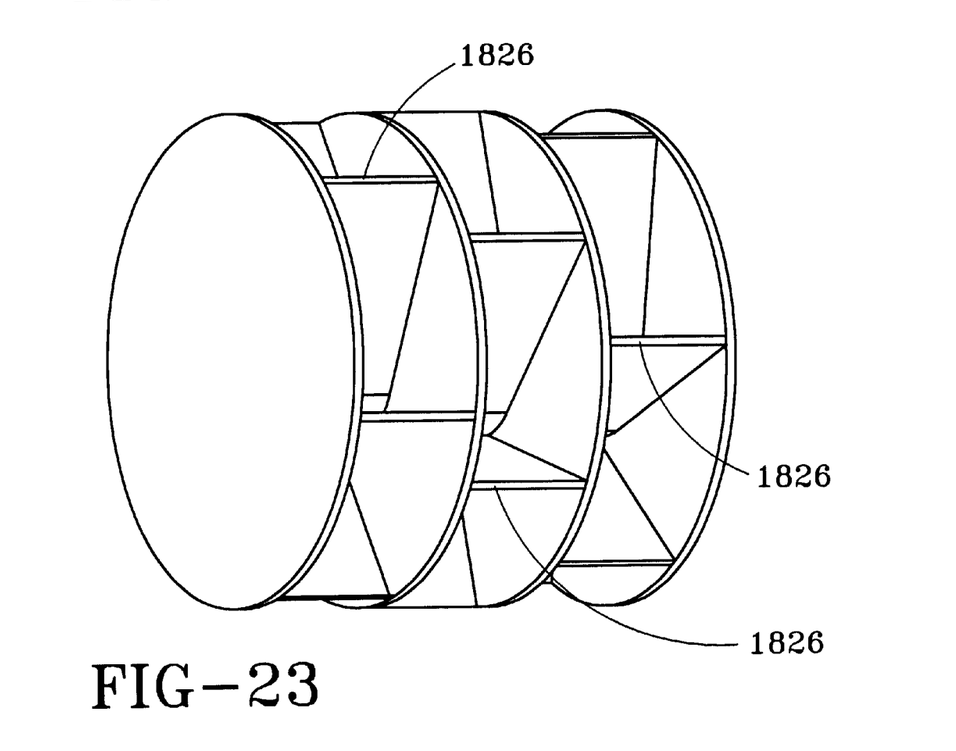
FIG. 23 is a perspective view similar to FIG. 20 of yet another embodiment of the invention.

The embodiment of FIG. 22 shows a turbine having cupped shaped runner blades 1726. The embodiment of the invention shown in FIG. 23 discloses three runner sections stacked together where the runner blades 1826 are not in line with each other from one runner section to the next runner section. This staggered effect may be used to help reduce pulsation effects from incoming water.

Figure 24:
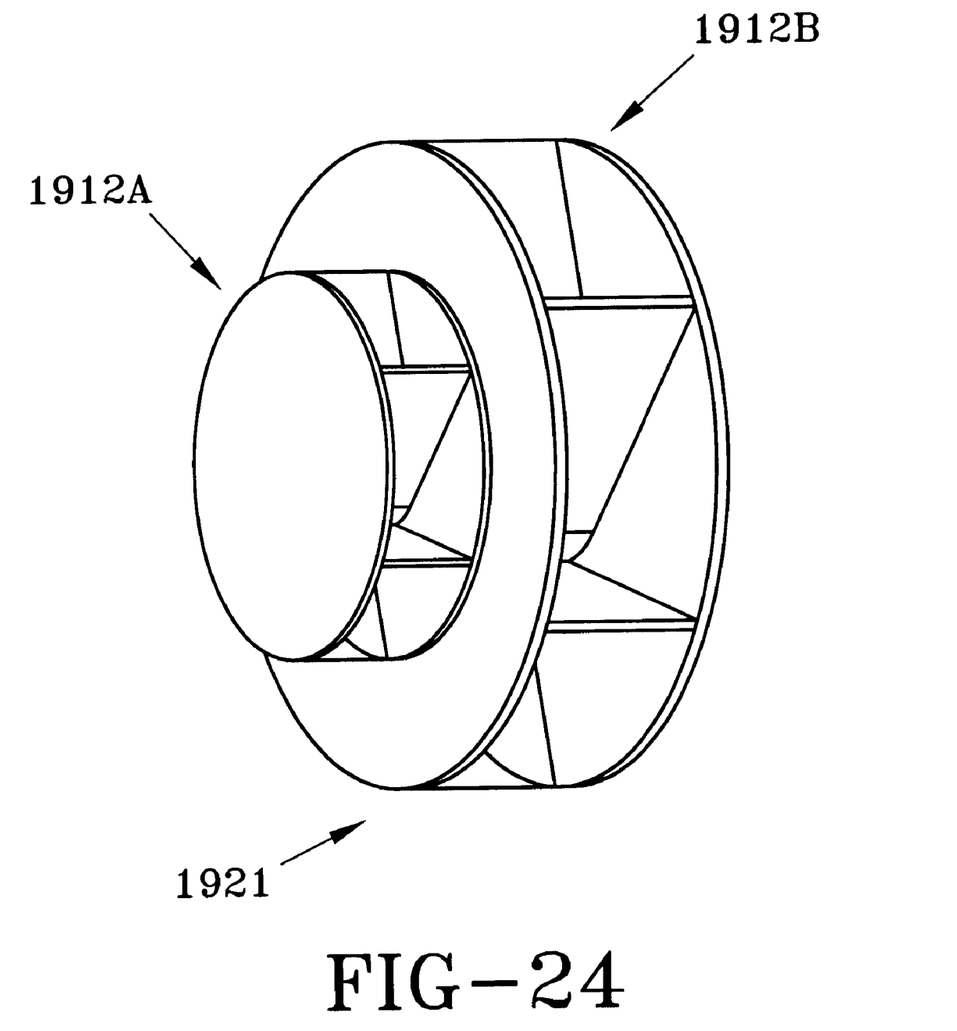
FIG. 24 is a perspective view similar to FIG. 20 of yet another embodiment of the invention.

In the embodiment of the invention shown in FIG. 24, a turbine 1921 with two runner sections 1912A, 1912B of different diameters is disclosed. In situations where the head and flow rate may vary frequently, the water flow can be directed from one runner section to the other to help maintain consistent speed of rotation and maximum available torque.

In general, turbine generating systems of this type can be constructed in various sizes ranging from a few kilowatts to 50 megawatts or more in output. An assortment of conventional control systems such as governors, valves and electrical relays can be utilized as desired. Any of a number of conventional housings can be utilized as desired to cover the turbine, gearbox, generator and control system to protect them from weather elements. The major benefit from the high torque turbine generating system is lower cost. This is due mostly to reduced work requirements for installation at dam sites. Another benefit is to provide a family of turbines regarding size and design characteristics to accomodate nearly all ranges of head and flow rates. Still another benefit is to provide for low cost installation of a power generating system in areas where no dam exists by connecting waterways with a higher elevation to waterways with a lower elevation by means of pipes or penstocks. This provides a water source with a head differential to a turbine generating system installed on the river bank in such a manner as to discharge water from the turbine into the river.

The foregoing specification sets forth the invention in its preferred, practical forms, but the structure shown is capable of modification within a range of equivalents without departing from the invention which is to be understood as defined by appended claims.

What is claimed is:

1. A water driven impulse turbine, comprising:
   an axle;
   a wheel mounted upon said axle, said wheel having a plurality of axially aligned runner sections each comprising a pair of side plates with a plurality of runner blades interposed therebetween, said runner sections having different sizes;
   a breastplate fixed adjacent to and substantially concentric with said wheel;
   a source of water in communication with said breastplate and said runner blades, said water passing through said breastplate against said runner blades and thereby effecting rotation of said wheel upon said axle; and,
   a conduit between said source of water and said breastplate.

2. A water driven impulse turbine, comprising:
   an axle;
   a wheel mounted upon said axle, said wheel having a pair of side plates and a plurality of runner blades interposed therebetween;
   a source of water in communication with said runner blades said water passing against said runner blades and thereby effecting rotation of said wheel upon said axle; and,
   a first barrel section that is selectively positionable between a pair of said runner blades, said fist barrel section being selectively securable to said pair of runner blades and said side plates.

3. The water driven impulse turbine according to claim 2, wherein said first barrel section changes the volume of water said wheel can accept between said pair of runner blades.

4. The water driven impulse turbine according to claim 2, wherein said first barrel section keeps said source of water closer to said periphery of said wheel between said pair of runner blades than without the use of said first barrel section.

5. The water driven impulse turbine according to claim 2, wherein said first barrel section has a flat shape.

6. The water driven impulse turbine according to claim 2, wherein said first barrel section has a concave shape.

7. The water driven impulse turbine according to claim 2, wherein said first barrel section has a convex shape.

8. The water driven impulse turbine according to claim 2, further comprising a plurality of barrel sections that are selectively positionable between each pair of said runner blades.

9. The water driven impulse turbine according to claim 8, wherein said plurality of barrel sections change the volume of water said wheel can accept.

10. The water driven impulse turbine according to claim 8, wherein said plurality of barrel sections keep said source of water closer to said periphery of said wheel than without the use of said plurality of barrel sections.

11. The water driven impulse turbine according to claim 8, wherein said plurality of barrel sections have different shapes.

12. A water driven impulse turbine, comprising:
    an axle;
    a wheel mounted upon said axle, said wheel having first and second axially aligned runner sections each comprising a pair of side plates with a plurality of runner blades interposed therebetween, said first and second runner sections having different sizes; and,
    a source of water in communication with said runner sections, said water passing against said runner blades and thereby effecting rotation of said wheel upon said axle.

13. The water driven impulse turbine of claim 12 wherein said first runner section has a different diameter than said second runner section.

14. A method of rotating an impulse turbine comprising the steps of:
    providing an impulse turbine comprising an axle and a wheel mounted upon said axle, said wheel having a plurality of axially aligned runner sections each comprising a pair of side plates with a plurality of runner blades interposed therebetween, said runner sections having different sizes;
    providing a source of water in communication with each runner section; and,
    controlling the amount of water permitted to enter each runner section based on the flow characteristics of said source of water.

15. The method of claim 14 wherein the step of controlling the amount of water permitted to enter each runner section based on the flow characteristics of said source of water comprises the step of:
    controlling the amount of water permitted to enter each runner section based on the head of said source of water.

16. The method of claim 14 wherein the step of controlling the amount of water permitted to enter each runner section based on the flow characteristics of said source of water comprises the step of:
    controlling the amount of water permitted to enter each runner section based on the flow rate of said source of water.

17. The method of claim 14 wherein the step of controlling the amount of water permitted to enter each runner section based on the flow characteristics of said source of water comprises the step of:
    maintaining a consistent rotational speed of said wheel.

18. The method of claim 14 wherein the step of controlling the amount of water permitted to enter each runner section based on the flow characteristics of said source of water comprises the step of:
    maximizing the available torque for said wheel.

19. A method of rotating an impulse turbine comprising the steps of:
    providing an impulse turbine comprising an axle and a wheel mounted upon said axle, said wheel having a runner barrel and at least a first runner section that comprises a pair of side plates with a plurality of runner blades interposed therebetween;
    providing a source of water in communication said first runner section;
    securing a first barrel section to a pair of said runner blades and said side plates such that said first barrel section becomes the bottom of said runner between said pair of runner blades in place of said runner barrel; and,
    permitting said source of water to enter said first runner section.

20. The method of claim 19 wherein the step of securing a first barrel section to a pair of said runner blades and said side plates such that said first barrel section becomes the bottom of said runner between said pair of runner blades in place of said runner barrel, comprises the step of:

changing the volume of water that said first runner section can accept.

21. The method of claim 19 further comprising the step of:

removing said first barrel section based on the flow rate of said source of water.

22. The method of claim 19 further comprising the step of:

securing a plurality of barrel sections to said wheel such that at least one barrel section is positioned between every runner blade.

23. A method of maximizing the efficiency of an impulse turbine comprising the steps of:

providing an impulse turbine comprising an axle and a wheel mounted upon said axle, said wheel having at least a first runner section that comprises a pair of side plates with a plurality of runner blades interposed therebetween;

providing a source of water in communication said first runner section;

securing at least a first barrel section between a pair of adjacent runner blades and said side plates based on a relatively lower flow rate of said source of water; and, permitting said source of water to enter said first runner section.

24. The method of claim 23 further comprising the steps of:

removing said at least a first barrel section based on a relatively higher flow rate of said source of water.

25. The method of claim 23 wherein the step of securing at least a first barrel section between a pair of adjacent runner blades and said side plates based on a relatively lower flow rate of said source of water, comprises the step of:

keeping the weight of said water that enters said wheel closer to the periphery of said wheel.

* * * * *